US00RE42607E

(19) United States
(12) Reissued Patent
Marui

(10) Patent Number: US RE42,607 E
(45) Date of Reissued Patent: Aug. 16, 2011

(54) CLIPLESS BICYCLE PEDAL

(76) Inventor: Shinji Marui, Kobe (JP)

(21) Appl. No.: 10/106,794

(22) Filed: Mar. 26, 2002

Related U.S. Patent Documents

Reissue of:
(64) Patent No.: 6,216,558
Issued: Apr. 17, 2001
Appl. No.: 08/323,500
Filed: Oct. 14, 1994

U.S. Applications:
(63) Continuation of application No. 08/044,837, filed on Apr. 8, 1993, now abandoned.

(51) Int. Cl.
*G05G 1/14* (2006.01)
(52) U.S. Cl. ..... 74/594.6; 74/594.4
(58) Field of Classification Search ..... 74/594.4, 74/594.6; 36/131, 132
See application file for complete search history.

(56) References Cited

U.S. PATENT DOCUMENTS

| | | | | | |
|---|---|---|---|---|---|
| 4,488,453 | A | * | 12/1984 | Drugeon | 74/594.6 |
| 4,686,867 | A | * | 8/1987 | Bernard | 74/594.6 |
| 4,922,786 | A | | 5/1990 | Romano | |
| 5,003,841 | A | * | 4/1991 | Nagano | 74/594.4 |
| 5,048,369 | A | * | 9/1991 | Chen | 74/594.6 |
| 5,115,692 | A | * | 5/1992 | Nagano | 74/594.4 |
| 5,203,229 | A | | 4/1993 | Chen | |
| 5,213,009 | A | * | 5/1993 | Bryne | 74/594.4 X |
| 5,325,738 | A | | 7/1994 | Bryne | |
| 5,417,128 | A | | 5/1995 | Beyl | |
| 5,765,450 | A | | 6/1998 | Kruger et al. | |
| 5,787,764 | A | * | 8/1998 | Peyre | 74/594.6 |
| 6,205,885 | B1 | | 3/2001 | Hermansen et al. | |

FOREIGN PATENT DOCUMENTS

| | | | | |
|---|---|---|---|---|
| EP | 0428140 | * | 5/1991 | 36/131 |
| EP | 0485956 | * | 5/1992 | 74/594.6 |
| JP | 4-11592 | * | 1/1992 | 74/594.6 |

OTHER PUBLICATIONS

Abstract of the Japanese Document No. 03-34987, dated Apr. 5, 1991.

* cited by examiner

*Primary Examiner* — Vinh T. Luong
(74) *Attorney, Agent, or Firm* — Vic Y. Lin; Innovation Capital Law Group, LLP

(57) ABSTRACT

A clipless bicycle pedal employing a clamping mechanism which engages a binding plate on the bottom of a rider's shoe. The clamping mechanism includes two units which pivot about the same axis to engage the binding plate and which may share a biasing mechanism. The pivot axis maybe the same axis as the pedal shaft. The overall structure of the preferred embodiment provides a clipless pedal which is lightweight and easy to assembly and maintain.

57 Claims, 9 Drawing Sheets

FIG. 9
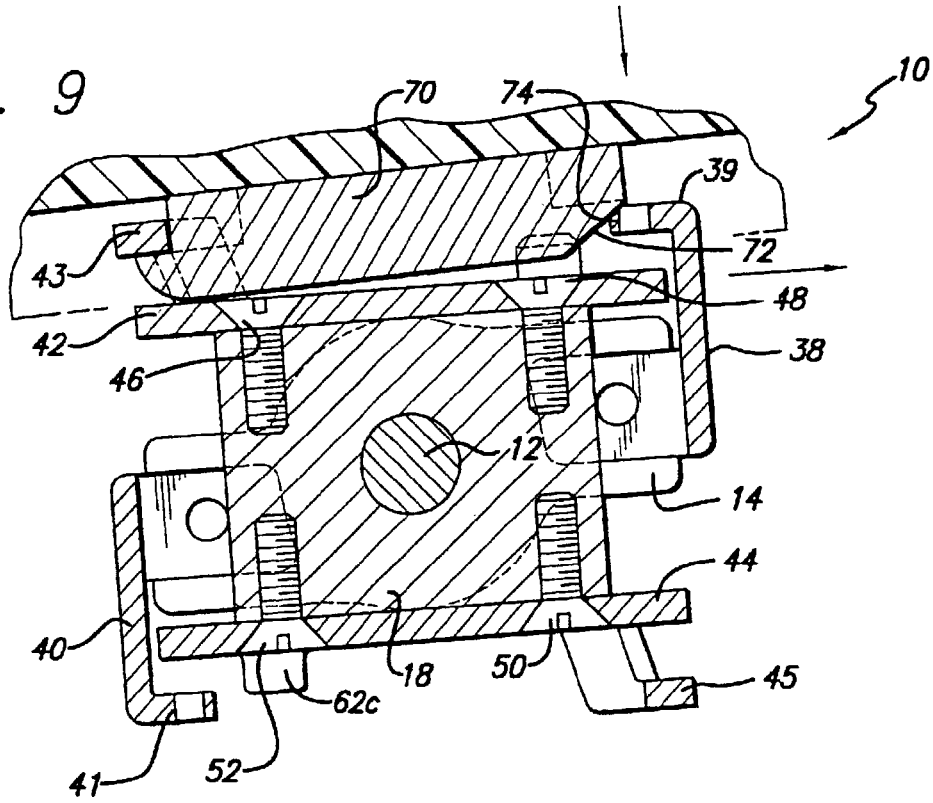
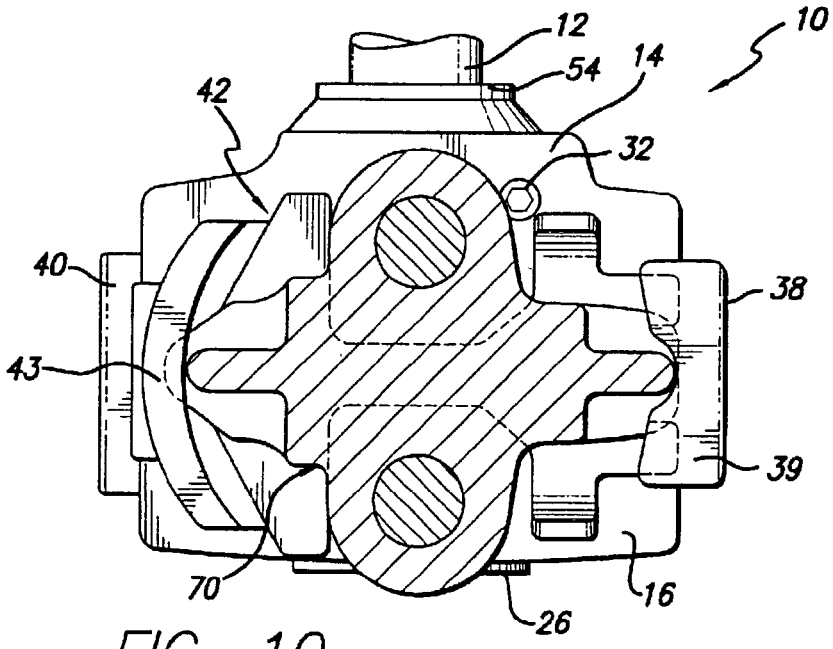
FIG. 10

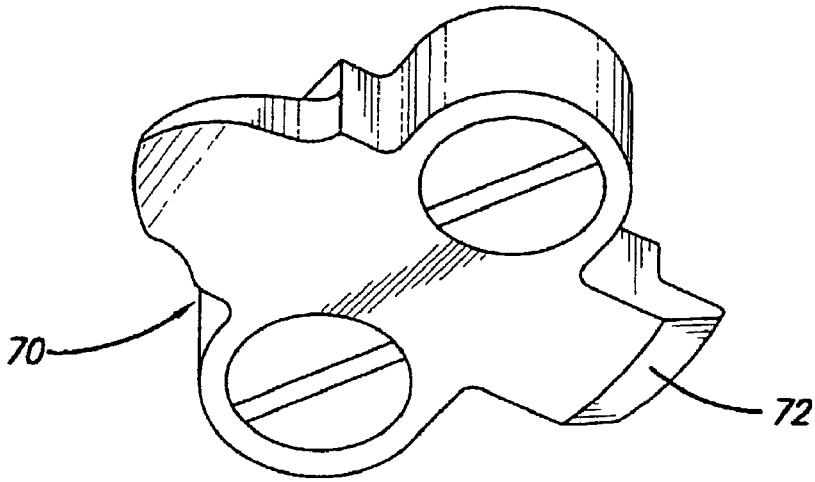
FIG. 11
FIG. 12
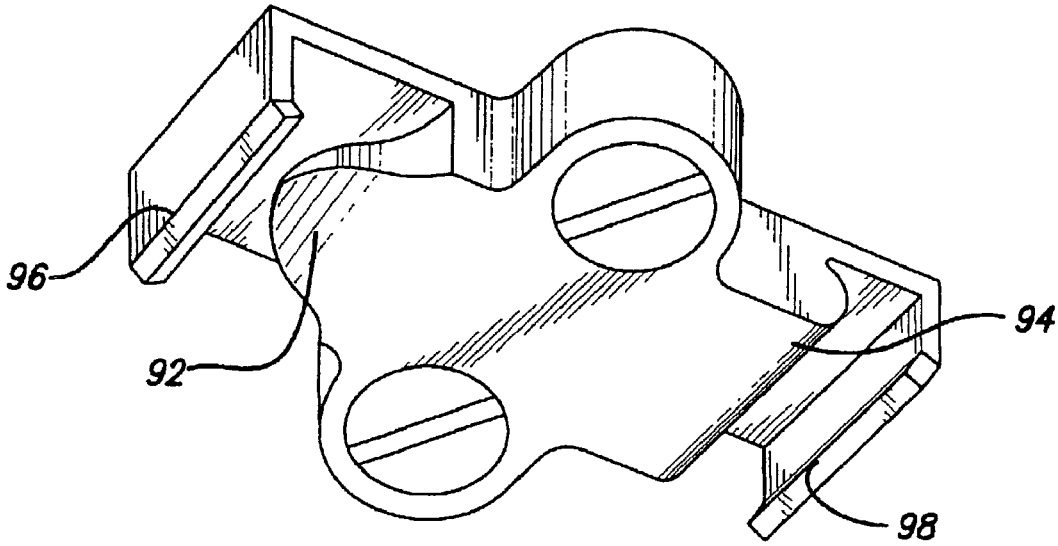

FIG. 14
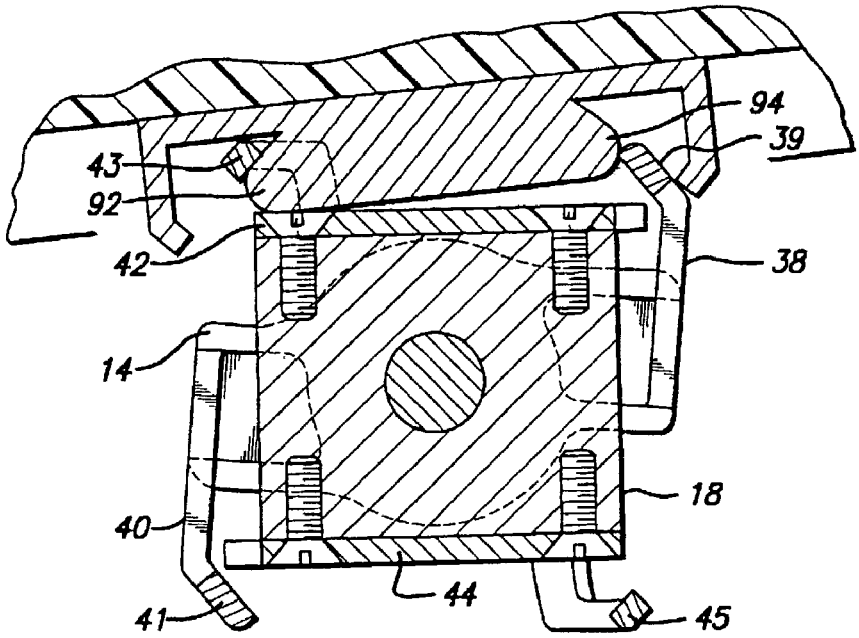
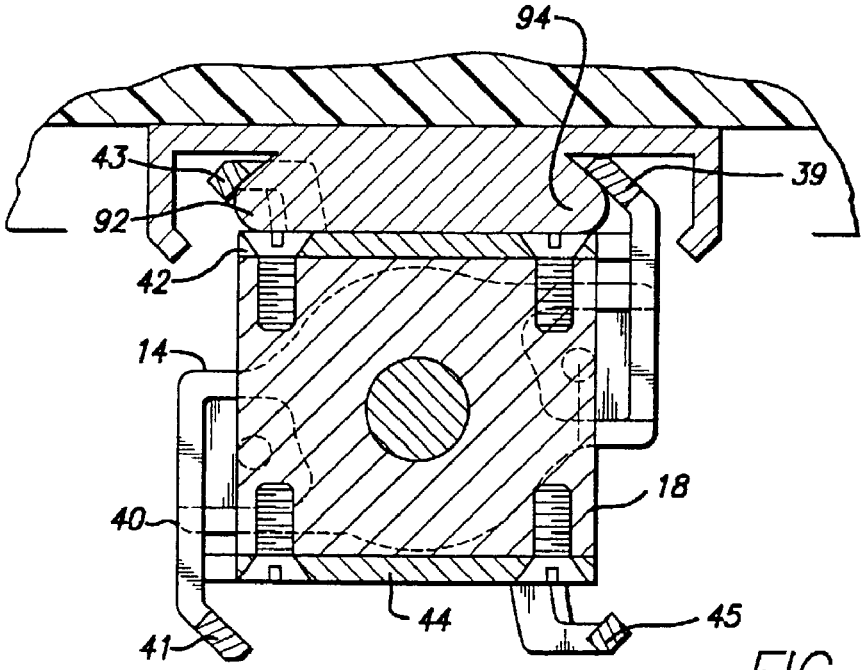
FIG. 15

FIG. 16
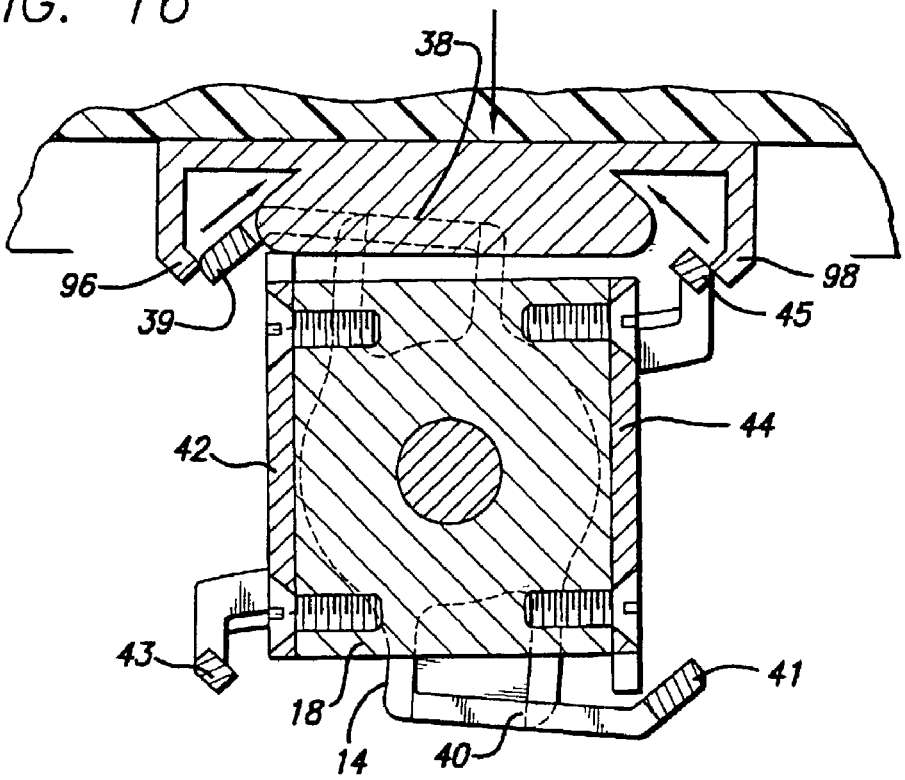
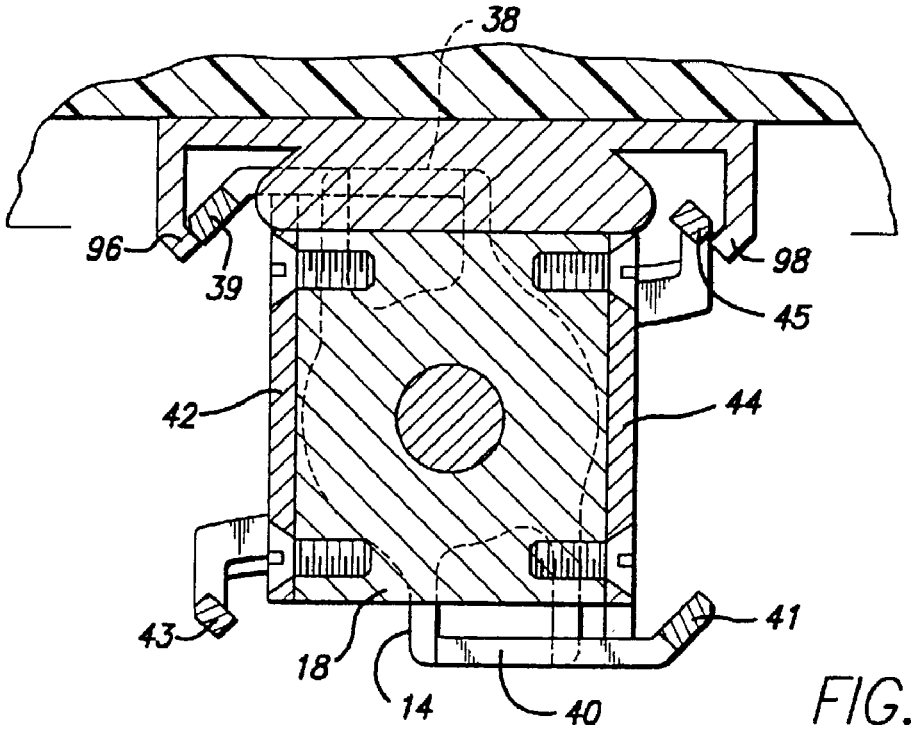
FIG. 17

CLIPLESS BICYCLE PEDAL

Matter enclosed in heavy brackets [ ] appears in the original patent but forms no part of this reissue specification; matter printed in italics indicates the additions made by reissue.

This application is a continuation of Ser. No. 08/044,837 filed Apr. 8, 1993 now abandoned.

BACKGROUND OF THE INVENTION

1. Field of the Invention

The present invention is directed to bicycle pedals and components. More particularly, the present invention is directed to bicycle pedals incorporating binding mechanisms which are used with binding plates on a shoe worn by a rider.

2. Description of the Related Art

In order to hold a rider's shoe in position on a bicycle pedal, bicycle pedals including toe-clips are employed to grasp the front portion of each of the rider's shoes. The toe-clips in conjunction with pedals and straps allow both downward and upward motion to be transmitted as drive force, however, toe-clips have the disadvantage that they do not provide for easy disengagement in the event of a fall. Thus, clipless pedals have been developed to overcome the disadvantages of pedals having toe-clips.

Clipless bicycle pedals use a binding mechanism on the pedal to engage a plate on a rider's shoe to hold the shoe in position on the pedal. The binding mechanism prevents the shoe from slipping off the pedal, while also providing for easy disengagement when stopping or in the event of a fall. Clipless pedals may also provide a positive pedaling force during both the upward and downward motions of the pedal. Conventional clipless pedals generally include a pedal body having a binding mechanism mounted thereon to engage said plate. The pedal body is, in turn, rotatably mounted on a pedal shaft. The binding mechanism includes a retaining claw fixedly mounted to said pedal body and a movable claw movably mounted to said pedal body and a spring which urges the movable claw toward the plate fixed to the bottom of the rider's shoe. The binding mechanism and said plate are designed to cooperate with each other so that a horizontal twisting or sliding movement of said plate produces a movement of the movable claw, permitting disengagement of said plate.

Due to the incorporation of the binding mechanism on the pedal body, however, conventional clipless pedals require a pedal body which is bulky and mechanically complicated. This makes their assembly and cleaning difficult and time consuming. Moreover, conventional clipless pedals have a relatively large number of components which increases their weight and cost.

Accordingly, there is a need for a clipless bicycle pedal which is lightweight, mechanically simple and relatively inexpensive.

SUMMARY OF THE INVENTION

The present invention provides a clipless bicycle pedal having a simplified structure which is lightweight and offers ease of assembly, and which further allows for easy disassembly during cleaning or maintenance.

The clipless pedal of the present invention includes a binding mechanism with one or more mounting positions, each having a clamping member and an engaging member. The binding mechanism engages a binding plate which is fixed to the sole of a rider's shoe, at one of the mounting positions depending on the pedal orientation at the time of the engagement. A biasing mechanism is integrated with the binding mechanism and biases the clamping member and the engaging member in such a way that the binding plate is secured to the binding mechanism at one of the mounting positions. The integrated biasing and binding structure of the preferred embodiment provides a clipless pedal without a bulky pedal body and which is easy to assemble and maintain.

In a preferred embodiment, the biasing mechanism includes a single helical biasing spring which is axially mounted over the pedal shaft to operate the binding mechanism. An adjustment screw is provided which adjusts the tension of the biasing spring thereby adjusting the binding strength of the binding mechanism. In the preferred embodiment, the components of the binding mechanism include an inner mounting block having a cylindrical cavity, a central block having a cylindrical cavity and an outer mounting block having a cylindrical cavity. In addition, the binding mechanism includes first and second clamping members and corresponding first and second engaging members.

The inner, central and outer mounting blocks are rotatably mounted to the pedal shaft which is received through the cylindrical cavities. The helical biasing spring is axially mounted over the shaft. One end of the helical biasing spring is coupled to the inner block while the other end is coupled to the central block. The first and second clamping members are attached to both the inner and outer mounting blocks so as to hold the inner and outer mounting blocks together, forming a plate clamping unit, and to move therewith about the longitudinal axis of the pedal shaft. The first and second engaging members are mounted to opposite sides of the central block, so as to form a plate engaging unit, which also rotates about the axis of the pedal shaft. The biasing spring biases the plate clamping unit and the plate engaging unit rotationally about the pedal shaft axis so as to provide a clamping action to engage the binding plate mounted on the bottom of the shoe.

Further features and advantages of the present invention will be appreciated by a review of the following detailed description of the preferred embodiments taken in conjunction with the following drawings.

BRIEF DESCRIPTION OF THE DRAWINGS

FIG. 9 is another end cut-away view of the clipless bicycle pedal taken through line 16, 17-16, 17 in FIG. 13, showing the operation of the clipless bicycle pedal during engagement with a binding plate fixed to the sole of a rider's shoe;

FIG. 10 is another top view of the clipless bicycle pedal taken through line 10-10 of FIG. 6 showing the engagement of the binding plate;

FIG. 11 shows a first embodiment of a binding plate for use with the clipless pedal of the present invention;

FIG. 12 shows a second embodiment of a binding plate for use with the clipless pedal of the present invention;

FIGS. 14 and 15 show end cut-away views of the second embodiment of the clipless bicycle pedal taken through line 14, 15-14, 15 of FIG. 13, showing the operation of the clipless bicycle pedal during engagement with the binding plate of FIG. 12 at a first position; and FIGS. 16 and 17 show end cut-away views of the second embodiment of the clipless bicycle pedal taken through line 16, 17-16, 17 in FIG. 13, showing the operation of the clipless bicycle pedal during engagement with the binding plate of FIG. 12 at a second position with the pedal rotated 90 degrees.

DETAILED DESCRIPTION OF THE PREFERRED EMBODIMENTS

Figure 1:
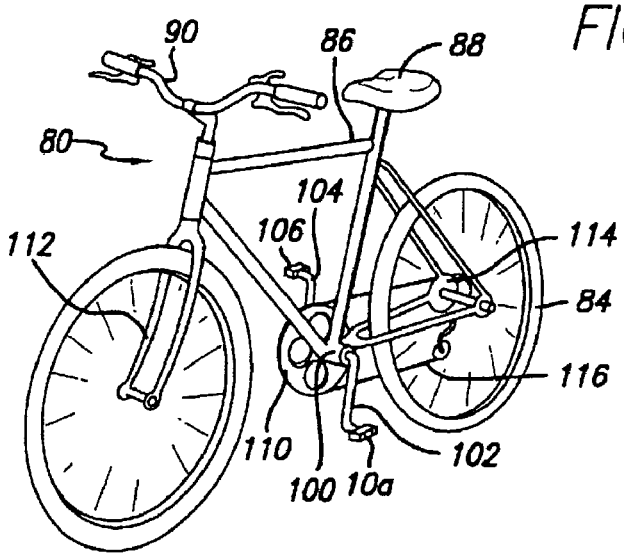
FIG. 1 is a perspective view of a bicycle employing a clipless pedal in accordance with the present invention.

FIG. 1 is a perspective view of a bicycle 80 employing a clipless pedal in accordance with the present invention. The bicycle 80 includes the familiar elements of front and rear wheels 82 and 84, frame assembly 86, seat 88, handlebars 90, fork 112, rear sprocket 114 and chain 116. In addition, bicycle 80 includes clipless pedals 10(a)-10(b) attached to left and right crank arms 102 and 104 respectively. Mounted to a shaft (not shown) which connects the left and right crank arms 102 and 104 on the right side of bicycle 80 is at least one sprocket 110 onto which chain 116 is mounted for driving the rear sprocket 114. Additional elements, including derailleurs for multiple sprockets and brakes may be added to bicycle 80 if required.

Figure 2A:
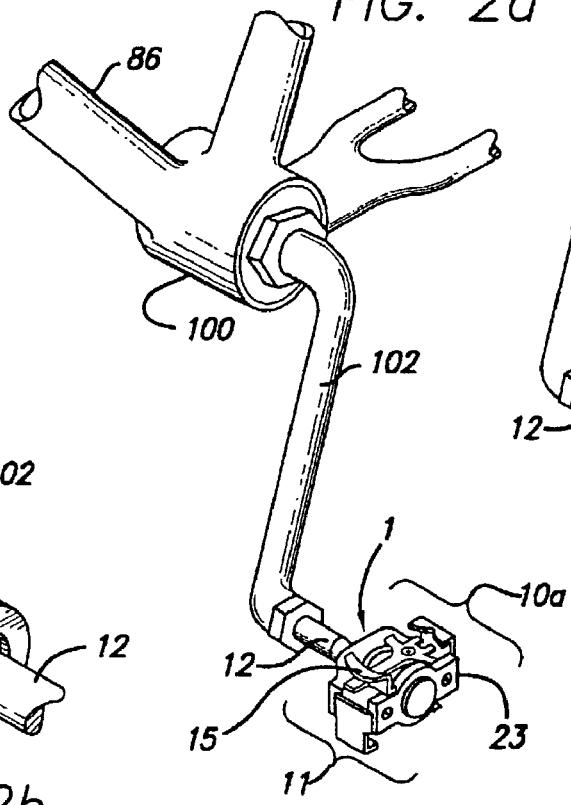
FIG. 2a is a perspective view of a bicycle crank and pedal assembly of the bicycle of FIG. 1.
Figure 2B:
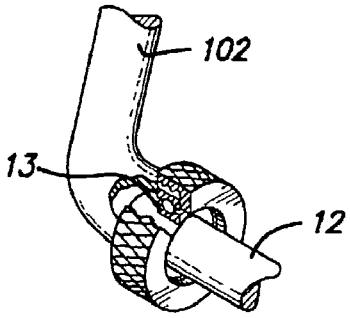
FIG. 2c is a perspective view of the pedal assembly of FIG. 2a rotated through 180° and FIG. 2b is a partial cut-away view of the crank arm and pedal shaft showing an optional rotatable mounting of the pedal shaft.
Figure 2C:
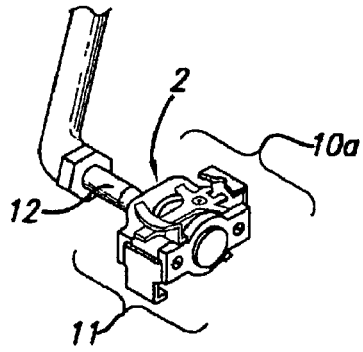

In FIG. 2a and FIG. 2c, a more detailed perspective view of crank arm 102 and clipless pedal 10(a) is shown. In a first embodiment, clipless pedal 10(a) includes a binding mechanism 11 rotatably mounted on pedal shaft 12. Binding mechanism 11 is adapted to engage a binding plate on a rider's shoe at either a first position 1 illustrated in FIG. 2a, or a second position 2, illustrated in FIG. 2c, as discussed in more detail below, to firmly hold the shoe without use of a conventional toe clip and strap. The binding mechanism 11 also serves as the pedal body making a very lightweight pedal having the advantage of clipless binding. The binding mechanism 11 preferably includes a binding plate engaging unit 15 and a binding plate clamping unit 23 which are biased relative to each other by a biasing means. As used herein the term "bias" or "biasing" when used with respect to two elements, means providing a tendency for the two elements to move relative to each other. Such movement may be rotational, linear or a combination thereof.

In FIG. 2b, an embodiment with a spindle 12 rotatably mounted to crank arm 102 is illustrated. This rotatable mounting is provided through a bearing assembly 13 configured within crank arm 102. This allows some parts of binding mechanism 11 to be fixedly mounted to pedal shaft 12 if desired. Bearing assembly 13 may be a ball bearing assembly or may employ other well known bearing types.

Figure 3:
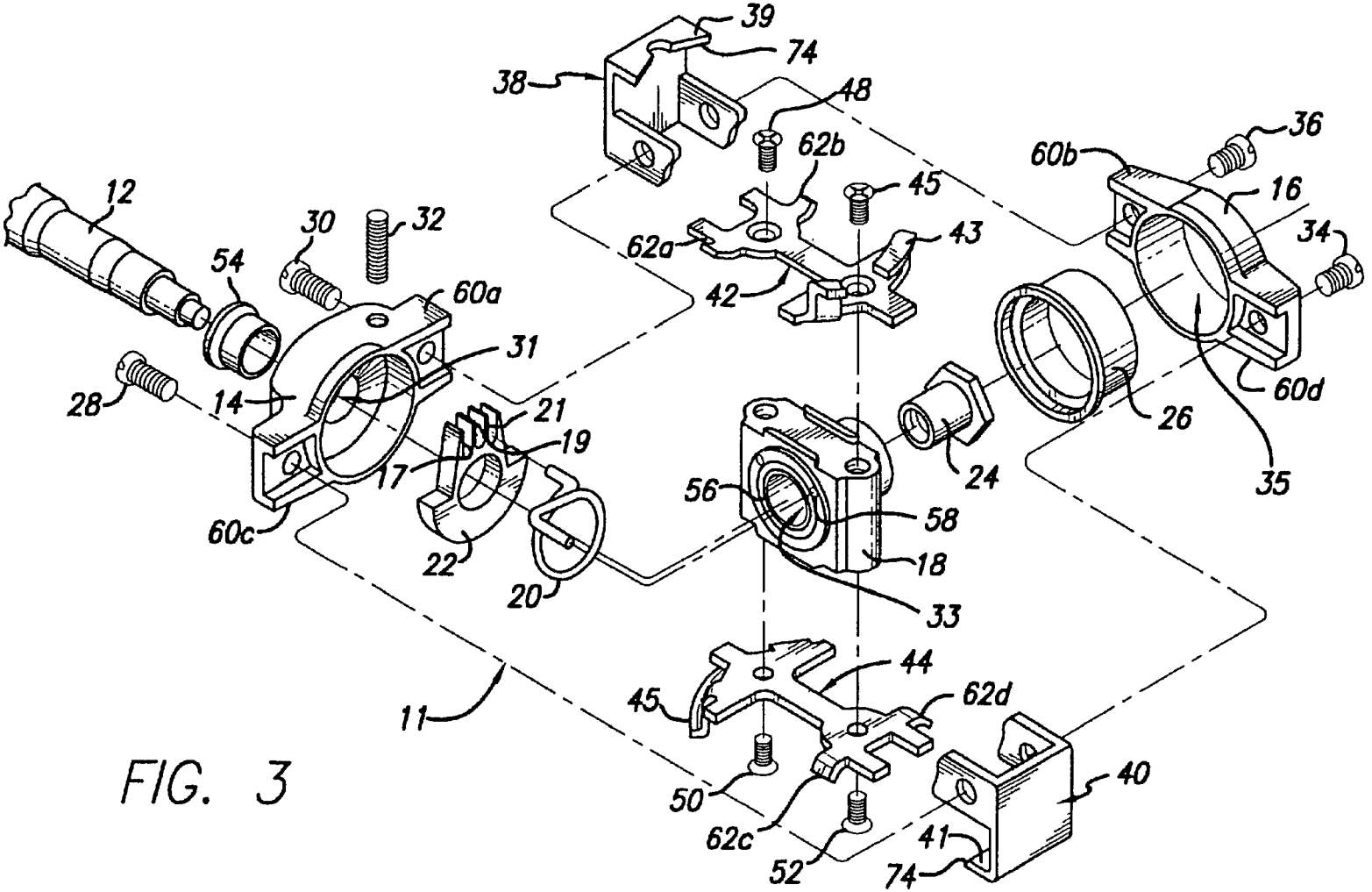
FIG. 3 is an exploded view of a first embodiment of a clipless bicycle pedal constructed in accordance with the present invention.

Referring now to FIG. 3, an exploded view of an embodiment of a clipless bicycle pedal 10(a) constructed in accordance with the present invention is shown. The binding mechanism 11 includes an inner *housing or* mounting block 14, an inner bushing 54, a spring bushing 22, a helical biasing spring 20, a biasing spring adjustment screw 32, a central *housing or* mounting block 18, a central bearing means 56, an outer *housing or* mounting block 16, and outer bushing 26 and a retaining nut 24. Mounted on the top and bottom of *a first housing or* central mounting block 18 are *preferably a first pair of hooked members such as* first and second engaging members 42 and 44, while mounted to both *a second housing or* inner mounting block 14 and *a third housing or* outer mounting block 16 are *preferably a second pair of hooked members such as* first and second clamping members 38 and 40. Central mounting block 18 and first and second engaging members 42, 44 cooperate to form plate engaging unit 15. Inner mounting block 14, outer mounting block 16, and first and second clamping members 38, 40 cooperate to form plate clamping unit 23. It will thus be appreciated that the conventional body portion of a pedal is dispensed with in the illustrated pedal of the present invention and is replaced with a first pedal portion comprising central mounting block 18 and a second pedal portion comprising inner mounting block 14, and outer mounting block 16, held together via first and second clamping members 38 and 40 as discussed below. It will further be appreciated that the inner mounting block 14 has a first annular opening 31, central mounting block 18 has a matching second annular opening 33, and outer mounting block 16 has a third annular opening 35, all adapted to receive the pedal shaft therethrough.

It should be appreciated that the specific pieces cooperating to form the binding mechanism illustrated in FIG. 3 are only exemplary and may be varied in both number and configuration. For example, while the plate engaging unit is illustrated configured as three pieces, i.e. engaging members 42, 44 and central mounting block 10, it may also be one integral piece. Equally, two or more portions may be used for the mounting block 18 similarly to the two piece clamping unit mounting block approach as illustrated by pieces 14, 16. Also, although an annular opening 31, 33 and 35 in the mounting blocks to accept pedal shaft 12 along an axis of the opening is illustrated, a non-annular opening may be employed. For example, the opening may be defined by two or more semi-circular portions.

Furthermore, the manner of coupling the various pieces illustrated in FIG. 3, and/or their material of composition may be varied. For example one of the portions of the plate engaging unit may be mounted rotatably about pedal shaft 12. Additionally, all or a portion of the plate engaging unit may be made of elastic material to provide some play or movement within the unit so as to facilitate engagement and/or disengagement or to alter the "feel" of the binding to the rider. Also, a portion of the plate engaging unit may be pivotally mounted to the other portion(s) of the unit to allow limited movement during engagement and/or disengagement. The pivot axis of such pivoting portion may be perpendicular or parallel to the pedal shaft axis. Alternatively, telescopic movement between at least one portion of the engaging unit and the other portion (s) of the unit may be provided.

Similarly, while the plate clamping unit is illustrated configured as several separate pieces, it may be formed as one integral piece, or two or more portions, may be used. Similarly, a single mounting block may be employed as in the case of the plate engaging unit as illustrated in FIG. 3. Although annular openings in mounting blocks 14, 16 are illustrated, non-annular openings may be employed. One of the portions of the plate clamping unit may be mounted rotatably about pedal shaft 12 and at least one of the other portions may be mounted relative thereto. Additionally, all or a portion of the plate clamping unit may be made of elastic material. Optionally, one of plate clamping unit or plate engaging unit may be wholly or partially made of elastic material with the other being rigid, so as to provide a desired degree of play or movement during engagement and/or disengagement. Also, a portion of the plate clamping unit may be pivotally mounted relative to other portion(s) thereof to allow limited movement during engagement and/or disengagement to facilitate such engagement and/or disengagement. The pivot axis of such portion may be perpendicular or parallel to the pedal shaft axis. Alternatively, a relative telescopic movement between at least one portion of the clamping unit and the other portion(s) of the unit may be provided.

Continuing with the embodiment illustrated in FIG. 3, pedal shaft 12 is preferably made of a single portion of alloy steel of sufficient strength for the desired application and has one or more cylindrical portions each having a diameter corresponding to, but slightly smaller than, the bore of each of inner bushing 54, spring bushing 22 and central bearing means 56. In forming the binding mechanism 11, inner bushing 54 may be press-fitted into inner mounting block 14. Similarly, central bearing means 56, which may be a plain bearing, a needle bearing, a ball bearing, or a combination of such bearings, is press fitted into central mounting block 18. Inner mounting block 14 is rotatably mounted on a first cylindrical portion of pedal shaft 12 via inner bushing 54 while spring bushing 22 is rotatably held within an annular shaped cavity of inner mounting block 14 and over a second cylindrical portion of pedal shaft 12. Similarly, central mounting block 18 is rotatably mounted to a third cylindrical portion of pedal shaft 12 via the central bearing means 56. Retaining nut 24 engages a threaded portion of pedal shaft 12 to retain central mounting block 18, spring bushing 22 and inner mounting block 14 on pedal shaft 12. The retaining nut 24 may be replaced with other retaining means, such as a snap ring or washer and bolt. Thus, the plate engaging unit and the plate clamping unit, comprised respectively of inner mounting block 14, outer mounting block 16, and central mounting block 18, each are allowed to rotate about the axis of the pedal shaft 12 independently of each other.

A number of alternate mounting approaches may equally be employed while providing the desired rotational freedom. For example, pedal shaft 12 may be made of two or more cooperating portions in which one portion is fixedly attached to crank arm 102, and the other cooperating portion(s) are rotatably mounted to the first portion. One of the plate engaging unit or plate clamping unit may then be directly mounted to the rotating portions. Alternatively, one of the plate engaging unit or plate clamping unit may be integrally formed with a rotating portion of the pedal shaft.

Alternatively, one portion of the plate engaging unit or plate clamping unit may be rotatably mounted to a portion of the other unit. The other unit is then mounted to the pedal shaft 12 in a fixed manner for a rotatable pedal shaft portion, or is rotatably mounted onto or into a pedal shaft portion which is itself fixedly attached to the bicycle crank arm. The axis of rotation of the plate clamping unit or plate engaging unit rotatably mounted to the other unit may or may not share the same longitudinal axis as the pedal shaft. Furthermore, at least two binding positions in an angular direction about such axis of rotation of the rotatably mounted unit may be provided.

Additionally, the manner in which the mounting of the various portions provides rotational freedom may be varied in numerous ways by employing well known bearing types and combinations. For example, bearing means 56 may be press-fitted into each of inner mounting block 14 and outer mounting block 16, while central mounting block 18 may contain a press-fitted bushing which acts as a plain bearing. A needle bearing may also be employed at one or more of these positions on the plate engaging unit or other bearing types may be employed. The plate clamping unit may similarly contain any of the above described types of bearings, or other well known bearings, so that either of plate engaging unit or plate clamping unit may be mounted via a variety of bearing types to pedal shaft 12. Additionally, either of plate engaging unit or plate clamping unit may contain a cylindrical portion which serves as a rotatable mounting for the other unit, and the unit not containing the cylindrical portion may be mounted about the axes of pedal shaft 12 and the cylindrical portion. Finally, either or both of plate engaging unit or plate clamping unit may be rotatably mounted at one or both ends to pedal shaft 12, or to both pedal shaft 12 and a portion of the other unit. One or both of the units may be mounted in such a way that permits play in a direction parallel to the axis of the pedal shaft 12 either with respect to the pedal shaft or with respect to the other unit. This arrangement allows a binding plate engaged to the unit to also have some play.

Continuing with FIG. 3, central mounting block 18 includes a cylindrical portion upon which outer bushing 26 is rotatably mounted. Outer mounting block 16 is then slidably fitted over outer bushing 26, and is held in place by screws 34 and 36 which thread into first and second clamping members 38 and 40. First and second clamping members 38 and 40 are also attached to inner mounting block 14 by screws 28 and 30. Thus, inner mounting block 14, outer mounting block 16 and first and second clamping members 38 and 40 are fixed together and are able to rotate around the axis of the pedal shaft 12 as a single clamping unit.

Spring bushing 22 is held within a cylindrical cavity of inner mounting block 14. Spring bushing 22 has spring engaging slots 17, 19 and 21 which receive one end of biasing spring 20. One of the three slots 17, 19, 21 may be selected during assembly for a rough setting of the biasing spring force. The other end of biasing spring 20 engages opening 58 in central mounting block 18. A plurality of openings for receiving one end of biasing spring 20 may be provided in central mounting block 18 also for a rough setting of the biasing spring force. Biasing spring 20 is thus mounted between spring bushing 22 and central mounting block 18. Spring bushing 22 includes a flattened portion which interacts with a biasing spring adjustment screw 32 for adjusting the rotational force (i.e. torque) required to rotate said plate engaging unit about the axis of the pedal shaft 12 with respect to said plate clamping unit. Biasing spring 20 provides the force needed to engage the binding mechanism to a binding plate fixed to the bottom of the rider's shoe as discussed below. Biasing spring 20 also provides the force which may be needed, depending upon the overall configuration, to keep the binding plate engaged to the binding mechanism.

A seal (not shown) to exclude moisture and dirt and/or to retain lubricants within the binding mechanism may be included at possible entry points to the binding mechanism, for example, between pedal shaft 12 and the plate engaging unit or plate clamping unit. A seal may also be provided on either or both of the plate engaging unit and plate clamping unit to retain lubricant and/or exclude dirt and water from these units individually. Alternatively, the seal may be configured between the plate engaging unit and plate clamping unit and at the inner and outer ends of the binding mechanism. The seal between the clamping and engaging unit may be configured to connect the plate engaging unit and plate clamping unit yet allowing independent rotation of each unit around the pedal shaft axis. It will be appreciated that any combination of these sealing arrangements which assures adequate containment of lubricant and/or exclusion of moisture and dirt may be employed.

Lubricant injection openings (not shown) may also be employed in inner mounting block 14, outer mounting block 16, and/or central mounting block 18. One or more gates may be provided for allowing injected lubricant, such as grease, to purge out from the gates to remove dust and other particles trapped between the lubricant injection openings and the gates. One or more routes may also be provided to allow the lubricant to pass between the plate engaging unit and plate clamping unit. The routes may also be closable so as to force lubricant only into the plate engaging unit or plate clamping unit to which the lubricant opening is provided. By selectively closing the routes between the units or the gates on some portions of the units, the routes may be combined to allow control of the lubricant to provide penetration through cither unit or to force lubricant out through the gates, thereby ensuring lubricant penetration to desired locations within the pedal.

Figure 4:
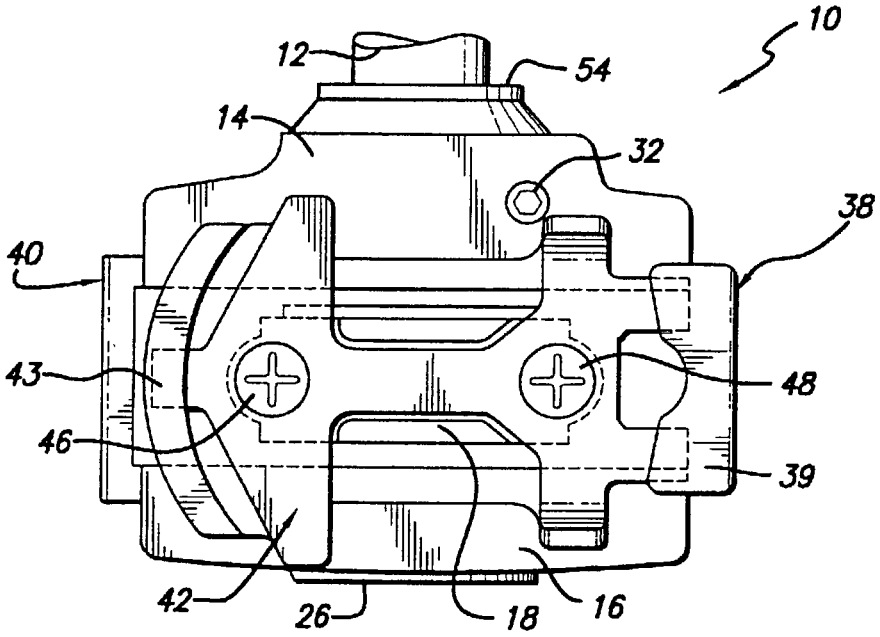
FIG. 4 is a top view of the clipless bicycle pedal of FIG. 3.

In FIG. 4 a top view of the clipless bicycle pedal 10 is shown. As shown in FIG. 4, engaging member 42 is mounted to central mounting block 18 by screws 46 and 48, while clamping member 38 is fixedly mounted to inner mounting block 14 and outer mounting block 16. This arrangement allows engaging member 42 to rotationally move relative to clamping member 38 about the axis of pedal shaft 12 during engagement and disengagement of the binding plate.

Figure 5:
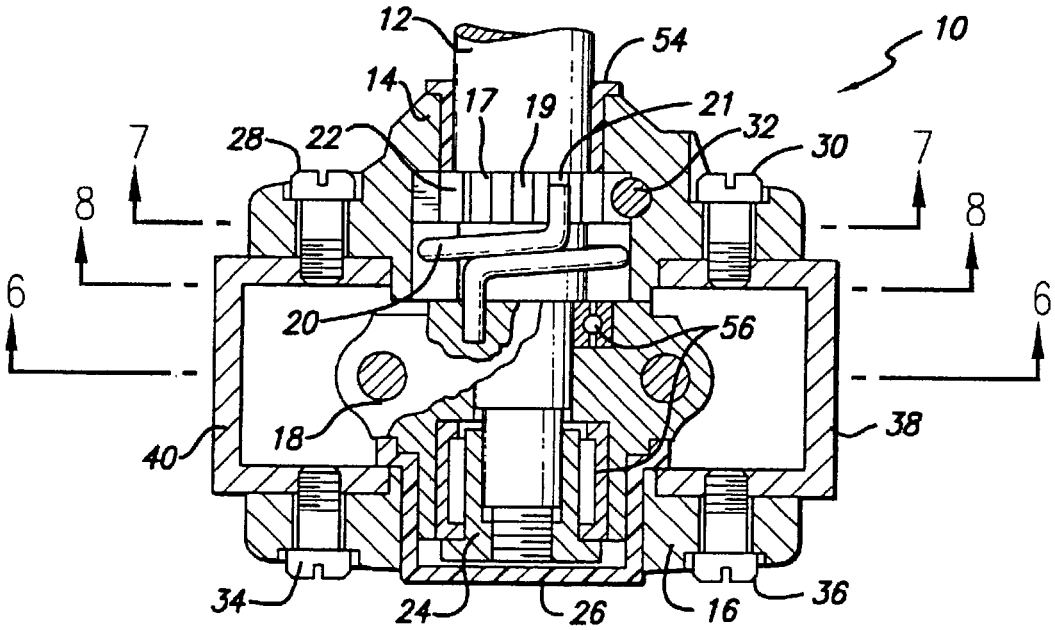
FIG. 5 is a top cut-away view of the clipless bicycle pedal of FIG. 4 which shows the principal components in an assembled configuration.

Referring to FIG. 5, the engagement of biasing spring 20 with respect to spring bushing 22 and central mounting block 18 is shown. As shown in FIG. 5, one end of biasing spring 20 is inserted into one of slots 17, 19, 21 (21 being shown) and, with respect to the rotational position of inner mounting block 14, is fixedly held by the combination of spring bushing 22 and adjustment screw 32. The other end of biasing spring 20 is inserted into an opening 58 in mounting block 18. The arrangement allows the clamping unit and engaging unit to rotate in relation to each other about the axis of the pedal shaft 12 under spring tension. Stated differently, the engaging unit is allowed to rotate in either direction from a neutral position which is determined by the position of adjustment screw 32. In addition, biasing spring adjustment screw 32 may be replaced by an adjustment plate or a mechanically-operated dial. It should be noted that this biasing force adjustment means is not mandatory in completing the binding mechanism. For example, spring bushing 22 and adjustment screw 32 may be dispensed with and a hole in inner mounting block 14 may be provided tor receiving one end of biasing spring 20 to securely position the spring 20 with respect to other components of the binding mechanism.

In another embodiment, an alternate biasing mechanism may be used in place of the helical spring. For example, an elastic material other than metal may be used in place of the helical spring, in either a compression or expansion configuration, to provide a relative biasing force between the plate engaging unit and the plate clamping unit. Alternatively, a portion of the engaging unit or clamping unit may be made of elastic material which is attached to or abuts against the other unit in a compression or expansion mode to provide the biasing force. Further, the biasing mechanism may be mounted outwardly on either the engaging or clamping member rather than being concealed within the binding mechanism. Such outwardly mounted biasing means may provide a biasing force either directly from one unit to the other or indirectly via a shoe, i.e., the biasing force acts from one unit to a shoe and reacts upon the other unit.

Alternatively, the biasing mechanism may be provided on the rider's shoe rather than being configured within the binding mechanism. For example, the biasing mechanism may be an elastic material or spring mounted outwardly on the bottom of the rider's shoe, so as to bias the units toward each other when the rider steps into the binding mechanism.

Continuing with FIG. 5, portions 60-a and 60-c integrated with inner mounting block 14 and Portions 60-b and 60-d integrated with outer mounting block 18 touch against stoppers 62-a, 62-c, 62-b and 62-d integrated with first and second engaging member 42 and 44 respectively. This arrangement keeps the biasing force which otherwise rotates the clamping unit, looking from crank arm 102, clockwise with respect to central mounting block 18, from making such rotation beyond the stoppers. Thus, whenever the clamping unit is pushed, again looking from crank arm 102, counterclockwise, a biasing force, countering to the force pushing the clamping unit, always exists.

In another embodiment, clipless pedal 10 may have additional binding positions for engaging the binding plate. For example, clipless pedal 10 may have outer and inner binding positions which provide different locations for binding along the central axis of the pedal shaft or along an axis parallel to the axis of the shaft. For example, in the former case the binding mechanism 11 illustrated in FIG. 2 may be duplicated at a position inward toward crank arm 102 along pedal shaft 12 or outward along the direction of the axis of shaft 12.

The clipless pedal of the present invention may also be combined with a conventional pedal platform, either employing a conventional toe clip or not, to allow convenient use with or without a specially adapted shoe. Such conventional pedal platform may be provided at any of various positions relative to the clipless pedal portion of the combined pedal. For example, the conventional and clipless pedal positions may be side-by-side in the direction of the pedal shaft, side-by-side but offset relative to the pedal shaft, or spaced apart in the length direction of the bicycle. Similarly, the clipless pedal of the present invention may also be combined with other types of plate binding mechanisms. For example, a movable claw and another biasing means may be mounted onto the outer mounting 16 to form an additional binding mechanism in conjunction with one of clamping member 38 or 40.

Figure 6:
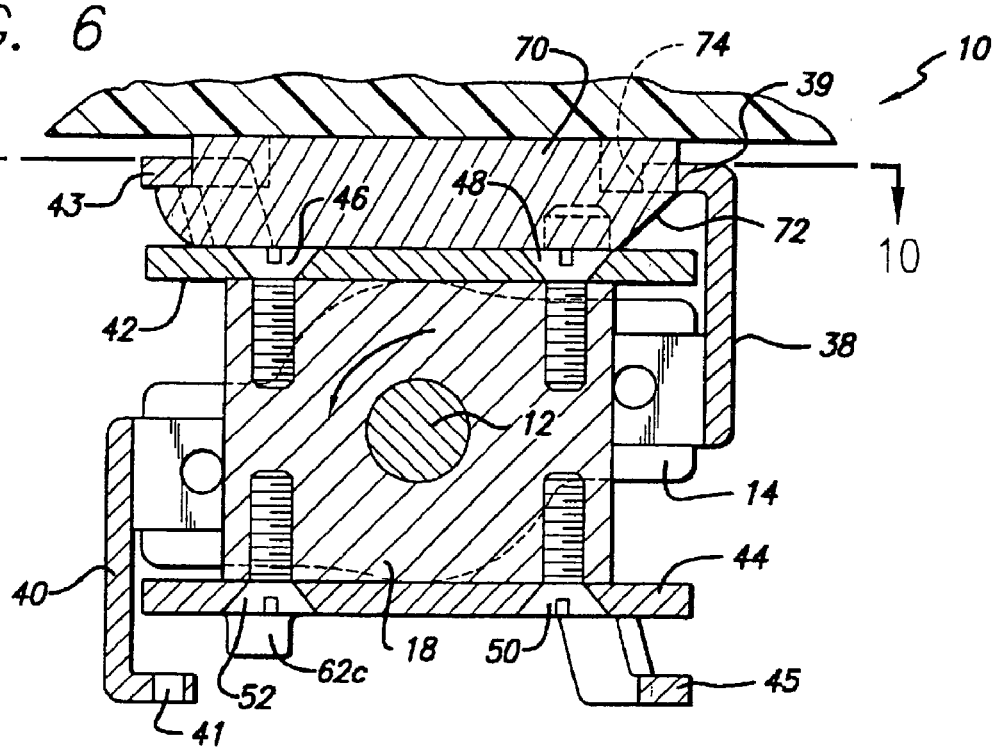
FIG. 6 is an end cut-away view of the clipless bicycle pedal of the present invention taken through line 6-6 of FIG. 5, showing the operation of the clipless bicycle pedal during engagement with a binding plate fixed to the sole of a rider's shoe.

The operation of clipless pedal 10 in the preferred embodiment will now be discussed with reference to FIGS. 6 and 9. As shown in FIG. 6, a binding plate 70 is fixed to the sole of each of the rider's shoes for engaging to engaging hook 43 and clamping book 39. To engage, the front of the binding plate 70 is first hooked into the engaging hook 43. The rider then pushes down on the rear of the shoe, as shown in FIG. 9, causing the engaging unit 42 and clamping member 38 to rotate about the axis of pedal shaft 12. The angled surface 72 of binding plate 70 forces the distance between engaging hook 43 and clamping book 39 to increase. A chamfered surface 74 on clamping book 39 then allows the clamping unit, rotated by the biasing force, to return to its original position providing secure engagement of binding plate 70 between engaging hook 43 and clamping hook 39. Binding plate 70 can then be released from the engagement between engaging hook 43 and clamping hook 39 by rotating binding plate 70 in horizontal direction about an axis behind engaging hook 43 in a manner which disengages the plate clamping unit first.

Clipless pedal 10 may also have additional engaging and disengaging modes in which the functions of plate engaging unit and plate clamping unit are different from that described above. For example, the shape and configuration of the binding plate and engaging and clamping hooks may require that the binding plate be first engaged to plate clamping unit prior to engaging the plate engaging unit. Also, while disengagement occurs first at the rear of the binding plate, i.e. from the plate clamping unit in the illustrated embodiment of FIG. 6, it may equally be designed to disengage the front of the plate first. In still another engaging and disengaging mode, the designed function of the plate engaging unit and plate clamping unit may be substantially similar, so that either of the plate engaging unit or plate clamping unit may be engaged or disengaged in any order as desired by the rider. Further, whereas engagement has been described above as a vertical downward motion and disengagement as a horizontal movement, either engagement or disengagement may be equally achieved by movement of the binding plate in a direction substantially vertical or horizontal to the pedal shaft 12 in an appropriate design. Thus, any combination of vertical and horizontal movement for engagement and disengagement may be employed.

Figure 7:
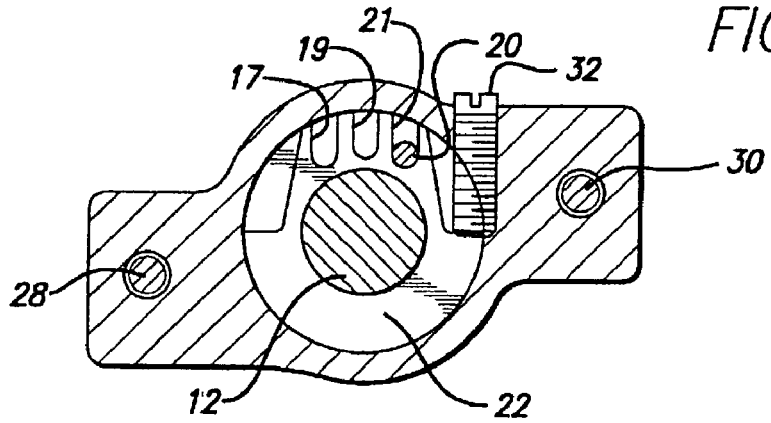
FIG. 7 is another end cut-away view taken through line 7-7 of FIG. 5 showing the operation of the spring bushing and tension adjustment screw.

FIG. 7 shows one embodiment of spring bushing 22 which provides plural slots 17, 19 and 21 for attaching biasing spring 20. Depending the particular hole selected, the basic tension, i.e. biasing force, of the spring can be selected, with finer tension adjustments being made by the tension adjustment screw 32.

Figure 8:
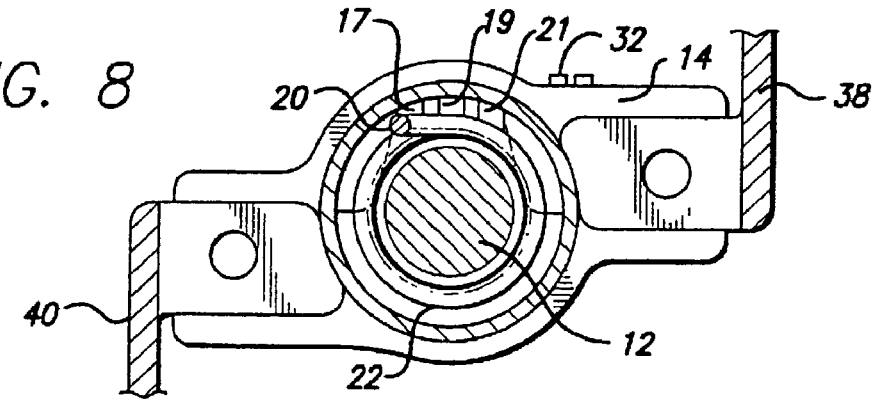
FIG. 8 is another end cut-away view taken through line 8-8 of FIG. 5 showing the position of the torsion spring.

As shown in FIG. 8 pedal shaft 12 is inserted actually through biasing spring 20, so that the resulting biasing forces act circumferentially about the pedal shaft 12. Since the diameter of biasing spring 20 will change as torsional forces are applied, ample room is provided within the cylindrical portion of innermounting block 14 to accommodate this change. This configuration thus provides a simply and easily maintained biasing system.

FIG. 10 is a top view of the clipless bicycle pedal showing the engagement of the binding plate. As shown in FIG. 10 the front portion of the binding plate is engaged under portion 43 of engaging member 42 and the rear portion of the binding plate is clamped under portion 39 of clamping member 38.

FIG. 11 shows one embodiment of the binding plate for use with the clipless pedal of the present invention. The binding plate shown in FIG. 11 includes the front portion and rear portions shown in FIGS. 9 and 10.

FIG. 12 is another embodiment of a binding plate for use with the clipless pedal of the present invention. The binding plate of FIG. 12 is designed to allow the plate to be engaged to the clipless pedal at one of two distinctly different modes, as will be discussed in connection with FIGS. 14 through 17.

Figure 13:
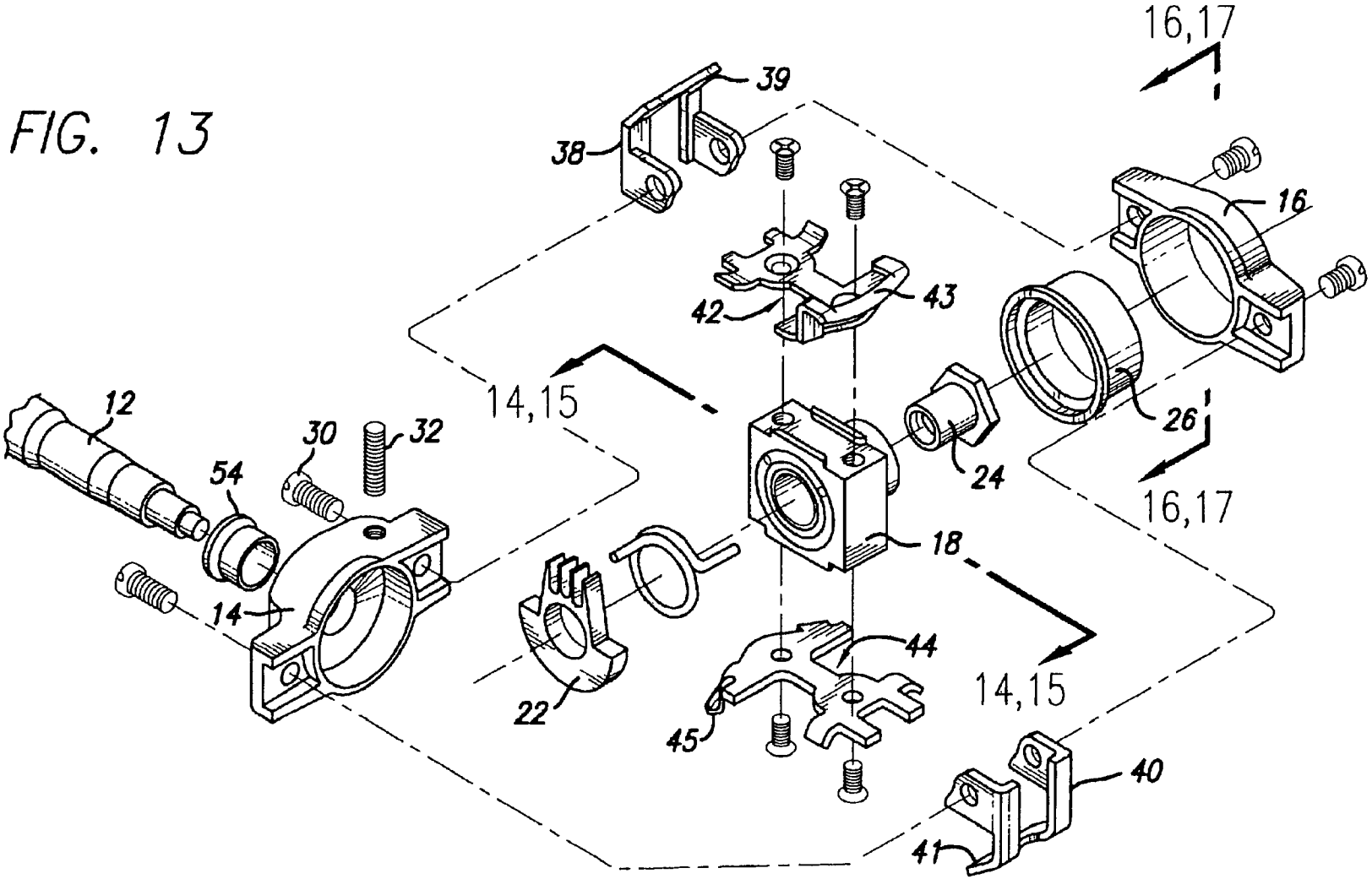
FIG. 13 shows an exploded view of a second embodiment of a clipless bicycle pedal for use with the binding plate of FIG. 12.

FIG. 13 is an exploded view of a second embodiment of a clipless bicycle pedal for use with the binding plate of FIG. 12. The major components of the second embodiment shown in FIG. 13 correspond generally to that of FIG. 3 and will not be described again in detail. Also, like numerals to FIG. 3 will be employed. The illustrated components include an inner mounting block 14 an inner bushing 54, a spring bushing 22, a helical biasing spring 20, a biasing spring adjustment screw 32, a central mounting block 18, a central bearing means 56, an outer -mounting block 16, an outer bushing 26 and a retaining nut 24. Also included are first and second engaging members 42, 44 and first and second clamping members 38, 40. The specific dimensions and configuration of the illustrated components is altered from the embodiment of FIG. 3 to allow the binding plate to be attached in either of two modes at respective positions of the pedal rotated through 90 degrees as shown in FIGS. 14 through 17.

Referring to FIGS. 14 and 15, the operation of the clipless binding pedal during engagement with the binding plate of FIG. 12 in the first binding mode is shown. As shown in FIG. 14, the middle front portion 92 of the binding plate is hooked under the engaging hook 43 of the engaging unit while the middle rear portion 94 of the binding plate is hooked beneath the clamping hook 39 of the clamping unit. The biasing force provided by the biasing spring forces these two hook portions together. Thus, as shown in FIG. 15, the binding plate is engaged between the engaging hook 43 and the clamping hook 39 in a manner similar to the embodiment of FIG. 3.

Referring to FIGS. 16 and 17, the engaging mode at a position rotated 90 degrees counterclockwise from that of FIGS. 14 and 15 is illustrated. The outer front portion 96 of the binding plate now is hooked over the outside of the clamping hook 39 while the outer rear portion 98 of the binding plate is hooked over the outside of the engaging hook 45. In this configuration, the biasing force acts to separate the clamping hook 39 and engaging hook 45. The binding plate is thus engaged outside of both the clamping hook 39 and the engaging hook 45 as shown in FIG. 17.

Note that the difference between FIGS. 14 and 15 and FIGS. 16 and 17 is that in FIGS. 14 and 15, the binding plate is between the engaging member and the clamping member while in FIGS. 16 and 17, the binding clamp is outside of the engaging member and the clamping member. Note also that FIGS. 14 through 17 show the same clipless pedal and binding plate, the difference being that the clipless pedal is rotated 90° so that there are four separate binding positions available on this embodiment of the clipless pedal *and the hooks 41, 43, 39 and 45 are spaced substantially 90° apart as may be seen by comparing FIG. 15 and FIG. 17*.

The foregoing description of the present invention is of a preferred embodiment which is subject to a number of modifications without departing from the spirit and scope of the invention. Accordingly, the foregoing description of the preferred embodiment should only be viewed as illustrative and limited only by the following claims.

What is claimed is:

1. A bicycle pedal adapted for rotatable mounting to a bicycle pedal shaft and for use with a separate binding plate on a rider's shoe, said bicycle pedal comprising:

binding plate engaging means for engaging said binding plate, said binding plate engaging means having an opening to receive the pedal shaft and having first and second plate engaging members coupled so as to rotate together in response to insertion of said binding plate and;

binding plate clamping means for clamping said binding plate, said binding plate clamping means having first and second plate clamping members, coupled to rotate together and respectively spaced apart from said first and second plate engaging members so as to simultaneously rotate relative to both said first and second plate engaging members in an opposite angular direction therefrom in response to insertion of said binding plate; and biasing means for biasing said plate clamping members and said engaging members such that said first plate clamping member and said first plate engaging member cooperatively hold said binding plate in place at a first position and said second plate clamping member and said second plate engaging member cooperatively hold said binding plate at a second position.

2. A bicycle pedal adapted for rotatable mounting to a bicycle pedal shaft and for use with a separate binding plate on a rider's shoe, said bicycle pedal comprising:

binding plate engaging means for engaging said binding plate at one of first and second positions, said binding plate engaging means having an opening to receive the pedal shaft and having first and second plate engaging members configured on opposite sides of said opening;

binding plate clamping means for cooperating with said binding plate engaging means to engage said binding plate, said binding plate clamping means having first and second plate clamping members configured at said first and second positions, respectively spaced apart from said first and second plate engaging members; and biasing means for biasing said plate clamping members and said engaging members, wherein said biasing means comprises a helical spring configured so as to receive the pedal shaft therethrough.

3. A bicycle pedal as set out in claim 1, wherein said binding plate clamping means further comprises an inner mounting block and an outer mounting block each attached to the first and second plate clamping members, and rotatably mounted to the pedal shaft.

4. A bicycle pedal as set out in claim 1, wherein said binding plate engaging means further comprises a central mounting block attached to said first and second plate engaging members and rotatably mounted to the pedal shaft.

5. A bicycle pedal as set out in claim 1, wherein said biasing means comprises a helical spring coupled to said binding plate clamping means and to said binding plate engaging means.

6. A bicycle pedal for use with a separate binding plate on a shoe, said pedal comprising:

a first pedal portion having an axis of rotation, and having first and second plate engaging members on opposite sides of said axis; and a second pedal portion mounted so as to move, relative to said first pedal portion and independently thereof, about said axis of rotation in response to insertion of said binding plate between said first pedal portion and second pedal portion, said second pedal portion having first and second plate clamping members on opposite sides of said axis which move together in response to said insertion of said binding plate;

wherein one of said first and second plate engaging members and one of said first and second plate clamping members cooperate to hold said binding plate in place.

7. A bicycle pedal as set out in claim 6, further comprising biasing means for biasing said first pedal portion and said second pedal portion.

8. A bicycle pedal as set out in claim 7, wherein said pedal is adapted to receive a pedal shaft and wherein said biasing means is a helical spring configured so as to receive the pedal shaft axially therethrough and having one end coupled in the first pedal portion and the other end coupled to the second pedal portion.

9. A bicycle pedal as set out in claim 8, further comprising means for adjusting the tension on said biasing means.

10. A bicycle pedal assembly for use with a bicycle and a separate binding plate on a shoe, comprising:

pedal shaft;

a binding mechanism including an inner mounting block having a first opening receiving the pedal shaft, a biasing spring, a separate central mounting block having a second opening receiving the pedal shaft, and a separate outer mounting block having a third opening receiving the pedal shaft; and a clamping mechanism including a clamp member mounted to said inner and outer mounting blocks and an engaging member mounted to said central mounting block for clamping to the binding plate;

wherein said clamp member and said engaging member cooperate to hold said binding plate in place.

11. The pedal assembly of claim 10 wherein said pedal shaft is dimensioned to provide mounting surfaces for said binding mechanism.

12. The pedal assembly of claim 10 further comprising a torsion spring axially mounted about said pedal shaft.

13. The pedal assembly of claim 10 further comprising a biasing spring adjustment screw and a spring bushing.

14. A bicycle pedal for use with a separate binding plate on a rider's shoe, comprising:

binding plate engaging means for engaging said binding plate at least one position, said binding plate engaging means configured to pivot about an axis of a pedal shaft; and binding plate clamping means for engaging said binding plate at said at least one position in combination with said plate engaging means, said binding plate clamping means configured to pivot relative to said binding plate engaging means about said axis of said pedal shaft;

wherein said plate engaging means and said plate clamping means pivot relative to each other in opposite angular directions about said axis of said pedal shaft to hold said binding plate in place.

15. The bicycle pedal of claim 14, further comprising biasing means for biasing said plate engaging means and said plate clamping means.

16. The bicycle pedal of claim 15 wherein at least a portion of said biasing means is contained within openings provided on said plate engaging means and/or on said plate clamping means.

17. The bicycle pedal of claim 15 wherein at least a portion of said binding plate engaging means and at a least portion of said binding plate clamping means engage said binding plate therebetween.

18. The bicycle pedal of claim 14, wherein said engagement occurs when a distance between said portion of the binding plate engaging means and said portion of the binding plate clamping means decreases and wherein said disengagement occurs when a distance between said portion of binding plate engaging means and said portion of binding plate clamping means increases.

19. The bicycle pedal of claim 14 wherein at least one portion of said binding plate engaging means and at least one portion of said binding plate clamping means are engaged between at least two portions of said binding plate.

20. The bicycle pedal of claim 17 wherein said engagement occurs when a distance between said portion of the binding plate engaging means and said portion of the binding plate clamping means increases.

21. The bicycle pedal of claim 17 wherein said disengagement occurs when a distance between said portion of the binding plate engaging means and said portion of the binding plate clamping means decreases.

22. The bicycle pedal of claim 14, wherein said binding plate engaging means is further configured to move a relatively small amount in a direction parallel to the axis of the pedal shaft.

23. The bicycle pedal of claim 14, wherein said binding plate clamping means is further configured to move a relatively small amount in a direction parallel to the axis of the pedal shaft.

24. A crank arm assembly adapted for engagement and disengagement of a separate binding plate on a rider's shoe, said crank arm assembly comprising:

binding plate engaging means for engaging said binding plate at least one position, said binding plate engaging means configured to pivot about an axis;

binding plate clamping means for engaging said binding plate at said position in combination with said plate engaging means, said binding plate clamping means configured to pivot about said axis;

common biasing means for biasing said plate engaging means relative to said plate clamping means about said common axis such that said binding plate clamping and engaging means are biased toward each other about said common axis to cooperatively hold said plate in place; and a crank arm assembly rotatably supporting said binding plate engaging means and said binding plate clamping means about said axis.

25. The bicycle pedal of claim 24, wherein said crank arm assembly comprises a pedal shaft mounted to a crank arm.

26. The bicycle pedal of claim 25, wherein said pedal shaft is rotatably mounted to said crank arm.

27. The bicycle pedal of claim 25, wherein said pedal shaft is fixedly mounted to said crank arm.

28. A bicycle pedal for use with a separate binding plate on a rider's shoe, comprising:

binding plate engaging means for engaging said binding plate at one of two or more positions; and binding plate clamping means for engaging said binding plate at said one of two or more positions in combination with said plate engaging means such that said binding plate clamping and engaging means cooperatively hold said plate;

wherein said binding plate engaging means and said binding plate clamping means are configured so as to rotate relative to each other about a common axis but in opposite angular directions during said engaging of said binding plate.

29. The bicycle pedal of claim 28, wherein said two or more positions are angularly spaced about said common axis.

30. The bicycle pedal of claim 28, further comprising biasing means for biasing at least a portion of, said plate engaging means and at least a portion of, said plate clamping means.

31. The bicycle pedal of claim 28 wherein at least a portion of said binding plate engaging means and at least a portion of said binding plate clamping means engage said binding plate therebetween.

32. The bicycle pedal of claim 31, wherein said respective portions are configured such that engagement occurs when a distance between said portion of the binding plate engaging means and said portion of the binding place clamping means decreases.

33. The bicycle pedal of claim 31, wherein said respective portions are configured such that disengagement occurs when a distance between said portion of the binding plate engaging means and said portion of the binding plate clamping means increases.

34. The bicycle pedal of claim 28, wherein at least a portion of said binding plate engaging means and at least a portion of said binding plate clamping means are engaged between at least two portions of said binding plate.

35. The bicycle pedal of claim 34, wherein said engagement occurs when a distance between said portion of the binding plate engaging means and said portion of the binding plate clamping means increases.

36. The bicycle pedal of claim 34, wherein said disengagement occurs when a distance between said portion of the binding plate engaging means and said portion of the binding plate clamping means decreases.

37. The bicycle pedal of claim 28, wherein said common axis is the axis of a pedal shaft.

38. The bicycle pedal of claim 28, wherein said binding plate engaging means is further configured to move a relatively small amount in a direction parallel to the axis of the pedal shaft.

39. The bicycle pedal of claim 28, wherein said binding plate clamping means is further configured to move a relatively small amount in a direction parallel to the axis of the pedal shaft.

*40. A bicycle pedal for releasibly engaging a cleat affixed to the bottom of a shoe, said pedal comprising:*

*a spindle with one end adapted for attachment to a bicycle crank arm;*

*a first housing and a second housing that rotates about said spindle, each housing separate from the other and having an opening for receiving said spindle, wherein said second housing mounted so as to move, relative to said first housing and independently thereof, in response to insertion of said cleat; and*

*a spring loaded latch mechanism that pivots concentrically with the axis of said spindle, wherein said latch mechanism comprises:*

*a first pair of hooked members and a second pair of hooked members, wherein the hooked members of each of said first and second pairs of hooked members are on opposite sides of the axis of said spindle, wherein said first pair of hooked members is connected to a portion of said first housing and said second pair of hooked members is connected to a portion of said second housing, said second pair of hooked members having hooked members coupled to simultaneously pivot together with respect to said first pair of hooked members in an opposite angular direction therefrom in response to the insertion of said cleat; and*

*a helical spring configured to receive the spindle therethrough and hold the hooked members of said first and second pairs of hooked members apart from each other at substantially equal angles of spacing;*

*wherein said spring loaded latch mechanism allows engagement with said cleat*

*between one hooked member of said first pair of hooked members and one hooked member of said second pair of hooked members.*

*41. The bicycle pedal according to claim 40 wherein said first housing rotates about said spindle on at least one bearing.*

*42. The bicycle pedal according to claim 40, wherein said pedal defines four separate cleat engagement positions.*

*43. The bicycle pedal according to claim 42, wherein said pedal has only one spring.*

*44. A bicycle pedal for releasibly engaging a cleat affixed to the bottom of a shoe, said pedal comprising:*

*a spindle with one end adapted for attachment to a bicycle crank arm;*

*a first housing, a second housing, and a third housing, each housing having an opening for receiving said spindle, wherein said second housing is separate from and between said first and third housings, said second housing mounted so as to move, relative to said first housing and independently thereof, about the axis of said spindle in response to insertion of said cleat; and*

*a spring loaded latch mechanism that pivots concentrically with the axis of said spindle, wherein said latch mechanism comprises:*

*hooked members for receiving said cleat including first and second engaging members connected to a portion of said second housing which are coupled to rotate together in an opposite angular direction from first and second clamping members in response to the insertion of said cleat, said first and second clamping members spaced apart from said first and second engaging members and connected to a portion of one of said first and third housings, wherein one of said first and second engaging members and one of said first and second clamping members form an adjacent pair of hooked members; and*

*a spring that holds said hooked members apart from each other at substantially equal angles of spacing;*

*wherein said spring loaded latch mechanism allows engagement with said cleat between said adjacent pair of hooked members.*

*45. The bicycle pedal according to claim 44, wherein the pedal defines four separate cleat engagement positions.*

*46. The bicycle pedal according to claim 44, wherein the spring of the pedal includes a spring having a coil axis that is substantially coincident with the axis of said spindle.*

*47. The bicycle pedal according to claim 44, wherein said adjacent pair of hooked members are connected to a portion of said first and third housings.*

*48. A bicycle pedal adapted for rotatable mounting to a bicycle pedal shaft and for use with a separate binding plate on a rider's shoe, said bicycle pedal configured to engage said binding plate in at least two positions, a first position and a second position, comprising:*

*an engagement assembly comprising: an opening to receive the pedal shaft and engaging hooks including a first engaging hook and a second engaging hook coupled so as to rotate together in response to insertion of said binding plate;*

*a clamp assembly mounted so as to move, relative to said engagement assembly and independently thereof, in response to insertion of said binding plate, said clamp assembly comprising: clamping hooks including a first clamping hook and a second clamping hook coupled to rotate together and respectively spaced apart from said first and second engaging hooks so as to simultaneously rotate relative to both said first and second engaging hooks in an opposite angular direction therefrom in response to insertion of said binding plate; and*

*a helical spring for biasing said clamping hooks and said engaging hooks such that said first clamping hook and said first engaging hook cooperatively hold said binding plate in place at said first position and said second clamping hook and said second engaging hook cooperatively hold said binding plate at said second position, wherein said helical spring is configured to receive the pedal shaft therethrough.*

*49. The bicycle pedal according to claim 48, wherein said pedal defines four separate cleat engagement positions.*

*50. The bicycle pedal according to claim 48, wherein said engagement assembly having an axis of rotation, and having said first engaging hook and said second engaging hook on opposite sides of said axis.*

*51. The bicycle pedal according to claim 50, wherein said clamping hooks are mounted so as to move, relative to said engaging hooks and independently thereof, about said axis of rotation in response to insertion of said binding plate between one of said clamping hooks and one of said engaging hooks.*

*52. The bicycle pedal according to claim 51, wherein said first clamping hook and said second clamping hook are connected to a first housing having an opening receiving said pedal shaft.*

*53. The bicycle pedal according to claim 52, wherein said clamping hook having an axis of rotation, said first clamping hook and said second clamping hook on opposite sides of said axis.*

*54. A bicycle pedal adapted for a rotatable mounting to a bicycle pedal shaft and for use with a separate binding plate on a rider's shoe, said bicycle pedal comprising:*

*a binding plate engaging hook having an axis of rotation about said pedal shaft for engaging said binding plate in at least two positions, a first position and a second position, said engaging hook having a portion connected to an opening to receive the pedal shaft and having first and second plate engaging members configured on opposite sides of said axis;*

*a binding plate clamping hook for cooperating with said engaging hook to engage said binding plate, said clamping hook having first and second plate clamping members configured at said first and second positions, respectively spaced apart from said first and second plate engaging members; and*

*a helical spring for biasing said plate clamping members and said plate engaging members, wherein said helical spring configured so as to receive the pedal shaft therethrough.*

*55. The bicycle pedal according to claim 54, wherein said pedal defines four separate cleat engagement positions.*

*56. The bicycle pedal according to claim 54, wherein said first and second engaging members are configured to rotate relative to said first and second clamping members in an opposite angular direction therefrom in response to insertion of said binding plate.*

*57. The bicycle pedal according to claim 56, wherein said first and second clamping members are mounted so as to move, relative to said first and second engaging members and independently thereof, about said axis of rotation in response to insertion of said binding plate between one of said first and second clamping members and one of said first and second engaging members.*

* * * * *